US006848783B2

(12) United States Patent
Dietz

(10) Patent No.: US 6,848,783 B2
(45) Date of Patent: Feb. 1, 2005

(54) EYEGLASS ASSEMBLY WITH REMOVABLE AUXILIARY EYEGLASSES ATTACHMENT

(76) Inventor: Dan L. Dietz, 10234 Emerald Dr., Houston, TX (US) 77074

( * ) Notice: Subject to any disclaimer, the term of this patent is extended or adjusted under 35 U.S.C. 154(b) by 0 days.

(21) Appl. No.: 10/342,723

(22) Filed: Jan. 15, 2003

(65) Prior Publication Data

US 2004/0135966 A1 Jul. 15, 2004

(51) Int. Cl.[7] ............................................. G02C 9/00
(52) U.S. Cl. ................................... 351/47; 351/57
(58) Field of Search .......................... 351/47, 48, 57, 351/58, 44, 41, 158

(56) References Cited

U.S. PATENT DOCUMENTS

| | | |
|---|---|---|
| 1,898,059 A | 2/1933 | McDonald |
| 1,973,648 A | 9/1934 | Nagel ............................ 88/41 |
| 3,498,701 A | 3/1970 | Miller .......................... 351/57 |
| 3,531,188 A | 9/1970 | LeBlanc et al. .............. 351/48 |
| 3,565,517 A | 2/1971 | Gitlin et al. ................. 351/106 |
| 3,582,192 A | 6/1971 | Gitlin et al. ................. 351/52 |
| 3,838,914 A | 10/1974 | Fernandez .................. 351/106 |
| 4,050,785 A | 9/1977 | Auge ......................... 351/120 |
| 4,070,103 A | 1/1978 | Meeker ....................... 351/52 |
| 4,196,981 A | 4/1980 | Waldrop ..................... 351/59 |
| 4,316,654 A | 2/1982 | Allen .......................... 351/10 |
| 4,496,224 A | 1/1985 | Allen ......................... 351/155 |
| 4,541,125 A | 9/1985 | Phillips ........................... 2/10 |
| 4,662,729 A | 5/1987 | Dobson ...................... 351/123 |
| 4,747,183 A | 5/1988 | Drlik ........................... 16/228 |
| 4,771,515 A | 9/1988 | Guarro ............................. 24/3 |
| 4,809,406 A | 3/1989 | Tsai ................................ 24/3 |
| 4,903,375 A | 2/1990 | DiFranco ........................ 24/3 |
| 4,946,125 A | 8/1990 | McCarty .................. 248/316.7 |
| 4,949,432 A | 8/1990 | Wisniewski ..................... 24/3 |
| 5,005,263 A | 4/1991 | Barrett ............................ 24/3 |
| 5,018,242 A | 5/1991 | Guy et al. .................... 16/228 |
| 5,123,724 A | 6/1992 | Salk ............................ 351/57 |
| 5,235,727 A | 8/1993 | McCloskey ..................... 24/3 |
| 5,328,411 A | 7/1994 | Thornton, II ................ 473/36 |
| 5,351,098 A | 9/1994 | McDaniels et al. ......... 351/112 |
| 5,355,184 A | 10/1994 | Varveris et al. ............. 351/106 |
| 5,372,345 A | 12/1994 | Schmidt .................. 248/231.8 |
| 5,389,981 A | 2/1995 | Riach, Jr. .................... 351/158 |
| 5,408,279 A | 4/1995 | Chiou ........................ 351/121 |
| 5,408,728 A | 4/1995 | Wisniewski ..................... 24/3 |
| 5,414,906 A | 5/1995 | Kren .............................. 24/3.3 |
| 5,416,537 A | 5/1995 | Sadler ......................... 351/57 |
| 5,491,878 A | 2/1996 | Janouschek .................. 24/3.3 |

(List continued on next page.)

FOREIGN PATENT DOCUMENTS

| | | | |
|---|---|---|---|
| CN | 2510884 Y | 9/2002 | ............ G02C/5/14 |
| EP | 0 385 002 | 9/1990 | ............ G02C/5/14 |
| JP | 53-124455 | 10/1978 | ............ G02C/5/14 |
| JP | 54-21357 | 2/1979 | ............ G02C/5/14 |
| JP | 9-33865 | 2/1997 | ............ G02C/5/14 |
| JP | 11-64804 | 3/1999 | ............ G02C/5/14 |
| JP | U3097213 | 8/2003 | ............ G02C/5/14 |

*Primary Examiner*—Hung Xuan Dang

(57) ABSTRACT

An eyeglasses assembly comprising at least one magnetic hinge that holds a removable, auxiliary eyeglasses attachment onto eyeglasses. The magnetic hinge allows the user to pivot the auxiliary eyeglass attachment into an "up" position when not in use. The magnetic hinge also disengages to allow the auxiliary eyeglass attachment to be removed from the eyeglasses when desired. Moreover, the magnetic hinge holds the auxiliary eyeglasses attachment in place after the user rotates the auxiliary attachment into the "up" position. The eyeglasses assembly additionally comprises magnets that secure the auxiliary eyeglass attachment to the eyeglasses when in the "down" position and in use.

33 Claims, 7 Drawing Sheets

U.S. PATENT DOCUMENTS

| | | | |
|---|---|---|---|
| 5,568,207 A | 10/1996 | Chao | 351/57 |
| 5,630,258 A | 5/1997 | Schneider | 24/303 |
| 5,682,222 A | 10/1997 | Chao | 351/111 |
| 5,719,655 A | 2/1998 | Peschel et al. | 351/111 |
| 5,737,054 A | 4/1998 | Chao | 351/47 |
| 5,786,880 A | 7/1998 | Chao | 351/41 |
| 5,877,838 A | 3/1999 | Chao | 351/47 |
| 5,882,101 A | 3/1999 | Chao | 351/47 |
| 5,883,688 A | 3/1999 | Chao | 351/47 |
| 5,883,689 A | 3/1999 | Chao | 351/47 |
| 5,929,964 A | 7/1999 | Chao | 351/47 |
| 5,936,700 A | 8/1999 | Masunaga | 351/47 |
| 5,940,162 A | 8/1999 | Wong | 351/47 |
| D417,462 S | 12/1999 | Chang | D16/327 |
| 6,012,811 A | 1/2000 | Chao et al. | 351/47 |
| 6,017,120 A | 1/2000 | McCormick | 351/112 |
| 6,027,214 A | 2/2000 | Graham | 351/57 |
| 6,033,068 A | 3/2000 | Spilkin et al. | 351/113 |
| 6,045,221 A | 4/2000 | Resendez, Sr. | 351/112 |
| 6,053,611 A | 4/2000 | Ku | 351/47 |
| 6,092,896 A | 7/2000 | Chao et al. | 351/47 |
| 6,109,747 A | 8/2000 | Chao | 351/47 |
| 6,116,732 A | 9/2000 | Xiao | 351/47 |
| 6,132,040 A | 10/2000 | Xiao | 351/47 |
| 6,139,141 A | 10/2000 | Zider | 351/57 |
| 6,139,142 A | 10/2000 | Zelman | 351/57 |
| 6,149,269 A | 11/2000 | Madison | 351/147 |
| 6,164,774 A | 12/2000 | Cate | 351/47 |
| 6,168,273 B1 | 1/2001 | Dupraz et al. | 351/158 |
| 6,170,948 B1 | 1/2001 | Chao | 351/47 |
| 6,170,949 B1 | 1/2001 | Mauch | 351/47 |
| 6,206,519 B1 | 3/2001 | Lin | 351/47 |
| 6,210,003 B1 | 4/2001 | Chan | 351/112 |
| 6,217,170 B1 | 4/2001 | Hsiao | 351/153 |
| 6,331,057 B1 | 12/2001 | Strube | 351/47 |
| RE37,545 E | 2/2002 | Chao | 351/57 |
| 6,343,858 B1 | 2/2002 | Zelman | 351/47 |
| 6,367,126 B1 | 4/2002 | Rivkin | 24/3.3 |
| 6,375,324 B2 | 4/2002 | Schleger et al. | 351/121 |
| 6,412,942 B1 | 7/2002 | McKenna et al. | 351/47 |
| 6,425,664 B1 | 7/2002 | Liu et al. | 351/112 |
| 6,450,637 B1 | 9/2002 | Zelman | 351/47 |
| 6,488,372 B1 * | 12/2002 | Park | 351/47 |
| 6,505,932 B2 | 1/2003 | Xiao | 351/47 |
| 6,568,805 B1 | 5/2003 | Dietz | 351/57 |

* cited by examiner

EYEGLASS ASSEMBLY WITH REMOVABLE AUXILIARY EYEGLASSES ATTACHMENT

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

1. Field of the Invention

The present invention relates to eyeglasses. More particularly, the present invention relates to an eyeglasses assembly comprising eyeglasses and a removable, auxiliary eyeglasses attachment.

2. Description of the Related Art

Auxiliary eyeglass wear that permits ordinary eyeglasses to be used as sunglasses, reading glasses, or any other auxiliary type glasses is very popular. Usually, it provides the user with sunglasses without requiring the purchase of a second set of tinted prescription eyeglasses. Sometimes, it may provide the user with a second set of prescription lenses without requiring the purchase of a second eyeglass frame. By far the most common use is to provide tinted lenses that the user may raise or lower over conventional eyeglasses.

Leblanc and Bloch (U.S. Pat. No. 3,531,188) disclose flip-up auxiliary eyeglass wear mounted on conventional eyeglasses on the top of the eyeglasses frame. Waldrop (U.S. Pat. No. 4,196,981) discloses a lens positioning means for the eyeglasses lenses. The Waldrop positioning means includes a cylindrical magnet within a sleeve of ferrous material. The ferrous material is secured in an opening on the top of the eyeglasses frame to attach the lenses to the rest of the eyeglasses. Using this invention, the wearer could position the eyeglasses lenses up or down, but could not add or position auxiliary eyeglass wear. Sadler (U.S. Pat. No. 5,416,537) uses two magnetic attachments between the inside of the auxiliary eyeglass wear frame and the outside of the eyeglasses frame to attach the auxiliary eyeglass wear.

Chao discloses several designs, including eyeglasses with magnetic attachments above the temple bar extensions of the eyeglasses frame (U.S. Pat. Nos. 5,568,207 and RE 37,545E) or in the nosebridge (U.S. Pat. No. 5,737,054). Chao also discloses clamps above the legs or temple bars (U.S. Pat. No. 5,877,838) and projections inside legs or temple bars (U.S. Pat. No. 5,882,101). Chao also discloses hooks over legs or temple bars (U.S. Pat. No. 5,883,688). Chao also discloses studs that clamp the temple bar extensions of the eyeglasses frame (U.S. Pat. No. 5,883,689) and studs that fit into the top of the temple bar extensions (U.S. Pat. No. 5,929,964). Masunaga (U.S. Pat. No. 5,936,700) discloses an invention that uses two additional points that attach the auxiliary eyeglass wear frame, one at each of the extremities of the nosebridge. Wong (U.S. Pat. No. 5,940,162) uses two nosebridge attachment points that a locator pin aligns in the center of the nosebridge and no other attachments. In addition, Chao discloses inventions that use two nosebridge retainers and one attachment point (U.S. Pat. Nos. 6,012,811 and 6,092,896) and a flange over the primary eyeglass frame nosebridge (U.S. Pat. No. 6,109,747). Xiao (U.S. Pat. Nos. 6,116,732 and 6,132,040) uses an interlockable magnetic shelter frame with extensions above the temple bar extensions and an interlocking clipping wire at the nosebridge. Zider (U.S. Pat. No. 6,139,141) discloses using magnetic male/female stepped surfaces for coupling at various points between the eyeglasses frame and the auxiliary eyeglasses frame. Zelman (U.S. Pat. No. 6,139,142) uses magnets attached to appendages on the auxiliary eyeglasses frame mating with magnets mounted on the temple bar extensions and clips that fit over each lens in the eyeglasses frame. Madison (U.S. Pat. No. 6,149,269) uses uniblock housings for the magnets. Chao (U.S. Pat. No. 6,170,948 B1) discloses using studs on the outer ends of the eyeglasses frame that engage hooks on the outer edges of the auxiliary eyeglasses frame. Mauch (U.S. Pat. No. 6,170,949 B1) uses lugs above extensions on the outside of the eyeglasses frame. Strube (U.S. Pat. No. 6,331,057 B1) discloses an auxiliary eyeglasses frame that attaches at two points on top of the nosebridge of the eyeglasses frame. In addition, Zelman (U.S. Pat. No. 6,343,858 B1) uses extensions that mount under the temple bar extensions of the eyeglasses frame.

Thus, the prior art provides for auxiliary eyeglass lenses, such as those used in sunglasses, that may be readily attached or removed from eyeglasses, or that may be flipped up and down while attached, but not both. Thus, there is desired auxiliary eyeglass wear that attaches to eyeglasses and allows the user to flip up the auxiliary eyeglass wear when not in use as well as readily remove the auxiliary eyeglass wear from the eyeglasses frame.

SUMMARY OF THE EMBODIMENTS

One of the embodiments of the eyeglasses assembly comprises magnetic hinges that hold a removable, auxiliary eyeglasses attachment onto eyeglasses. The magnetic hinges each comprise a magnet on the eyeglasses that fits between two corresponding auxiliary magnets on the auxiliary eyeglasses attachment. The magnetic hinges thus allow the user to rotate the auxiliary eyeglass attachment to an "up" position when not in use. The magnetic hinges also disengage to permit the user to remove the auxiliary eyeglass attachment from the eyeglasses when desired. Moreover, the magnetic hinges hold the auxiliary eyeglasses attachment in place after the user has rotated the auxiliary attachment into the "up" position. The embodiment additionally comprises magnets that secure the auxiliary eyeglass attachment to the eyeglasses when rotated into the "down" position and in use.

Another embodiment of the eyeglasses assembly comprises a magnetic hinge that holds a removable, auxiliary eyeglasses attachment onto eyeglasses. The magnetic hinge comprises a magnet on the eyeglasses comprising a first portion and a second portion and an auxiliary magnet on the auxiliary eyeglasses attachment. The magnet first portion biases the auxiliary eyeglasses attachment into the "down" position. The magnet second portion biases the auxiliary eyeglasses attachment into the "up" position." The magnetic hinge thus allows the user to rotate the auxiliary eyeglass attachment to an "up" position when not in use. The magnetic hinge also disengages to permit the user to remove the auxiliary eyeglass attachment from the eyeglasses when desired. Moreover, the magnetic hinge holds the auxiliary eyeglasses attachment in place after the user has rotated the auxiliary attachment into the "up" position.

Another embodiment of the eyeglasses assembly comprises a magnetic hinge that holds a removable, auxiliary eyeglasses attachment onto eyeglasses. The magnetic hinge comprises a magnet on the eyeglasses, a first auxiliary magnet on the auxiliary eyeglasses attachment, and a second auxiliary magnet engaged with the first auxiliary magnet. The magnet attracts the first auxiliary magnet to bias the auxiliary eyeglasses attachment into the "down" position. The magnet attracts the second auxiliary magnet to bias the auxiliary eyeglasses attachment into the "up" position." The magnetic hinge thus allows the user to rotate the auxiliary eyeglass attachment to an "up" position when not in use. The magnetic hinge also disengages to permit the user to remove the auxiliary eyeglass attachment from the eyeglasses when desired. Moreover, the magnetic hinge holds the auxiliary eyeglasses attachment in place after the user has rotated the auxiliary attachment into the "up" position.

Thus, the embodiments comprise a combination of features and advantages that enable them to overcome various problems of prior devices. The various characteristics described above, as well as other features, will be readily apparent to those skilled in the art upon reading the following detailed description of the embodiments, and by referring to the accompanying drawings.

BRIEF DESCRIPTION OF THE DRAWINGS

For a more detailed description of the embodiments, reference will now be made to the following accompanying drawings.

DETAILED DESCRIPTION OF THE EMBODIMENTS

The present invention relates to an eyeglasses assembly with a removable auxiliary eyeglasses attachment and is susceptible to embodiments of different forms. The drawings and the description below disclose in detail specific embodiments of the present invention with the understanding that this disclosure is an exemplification of the principles of the invention. This disclosure does not limit the invention to that illustrated and described in the disclosure. Further, the different teachings of the embodiments discussed below may be employed separately or in any suitable combination to produce the desired results.

Figure 1A:
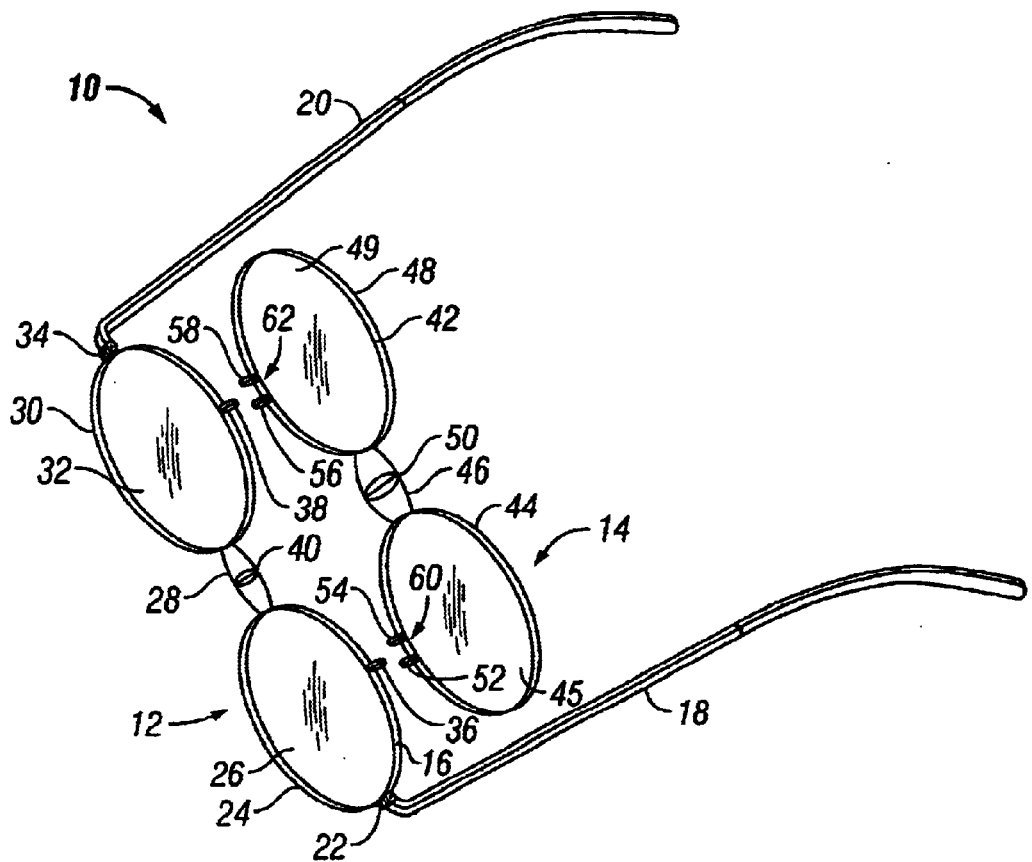
FIG. 1A is a perspective view of an eyeglasses assembly with eyeglasses disengaged from an auxiliary eyeglasses attachment.
Figure 1B:
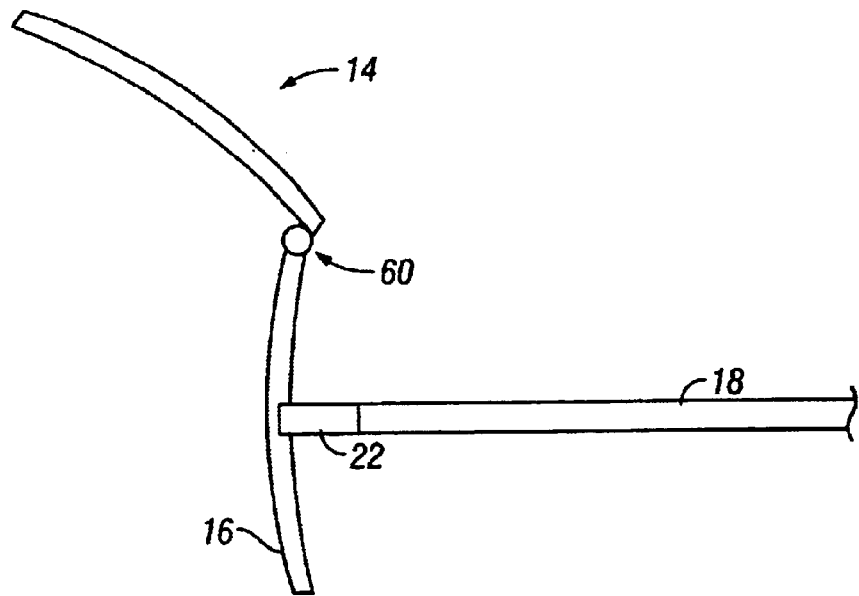
FIG. 1B is a side elevation view of the eyeglasses assembly with the auxiliary eyeglasses attachment engaged with the eyeglasses.
Figure 1C:
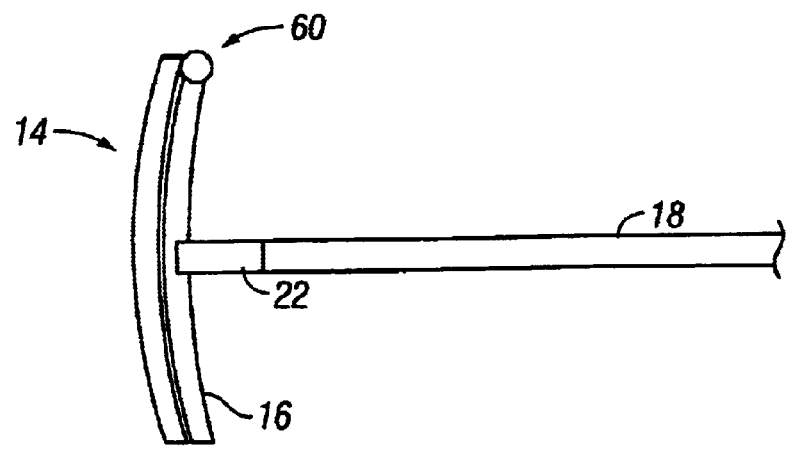
FIG. 1C is a side elevation view of the eyeglasses assembly with the auxiliary eyeglasses attachment engaged with the eyeglasses.

FIGS. 1A–1C show an eyeglasses assembly 10 comprising eyeglasses 12 and a removable, auxiliary eyeglasses attachment 14. In addition to the eyeglasses frame 16, the eyeglasses 12 also comprise a left temple bar 18 and a right temple bar 20, both of which are hinged to the frame 16. As a reference direction for the magnetic fluxes, the line that the eyeglasses 12 and the auxiliary attachment 14 lie in FIG. 1A is North-South ("N/S"). In addition, the line along which the fully unfolded temple bars 18, 20 lie is East-West ("E/W").

The eyeglasses 12 further comprise a left temple extension 22, a left lens frame 24, a left lens 26, a nosebridge 28, a right lens frame 30, a right lens 32, and a right temple extension 34. In addition, the eyeglasses 12 comprise a first magnet 36 engaged with the top of the frame 24. When magnetized, the first magnet 36 has a N/S magnetic flux. In addition, the eyeglasses 12 comprise a second magnet 38 engaged with the top of the frame 30. When magnetized, the second magnet 38 has a N/S magnetic flux. A third magnet 40, which when magnetized has an E/W magnetic flux, engages the nosebridge 28.

The auxiliary eyeglasses attachment 14 comprises an auxiliary frame 42. The auxiliary frame 42 comprises a left auxiliary lens frame 44, an auxiliary nosebridge 46, and a right auxiliary lens frame 48. In addition, the auxiliary frame 42 comprises a first auxiliary magnet 50 engaged with the auxiliary nosebridge 46. When magnetized, the auxiliary magnet 50 has an E/W magnetic flux. The auxiliary frame 42 also comprises left auxiliary lens 45 and right auxiliary lens 49. A second auxiliary magnet 52 and a third auxiliary magnet 54, both of which when magnetized have a N/S flux, engage the left auxiliary lens frame 44. A fourth auxiliary magnet 56 and a fifth auxiliary magnet 58, both of which when magnetized have a N/S flux, engage the right auxiliary lens frame 48. The magnets 36, 38, 40, 50, 52, 54, 56, and 58 may engage the respective frames 16, 42 by any suitable means. By way of example only, metal sleeves may fix the magnetic means on the top of the frames 16, 42. Alternatively, the auxiliary eyeglasses attachment 14 may only comprise two lenses with the magnets engaged with the lenses. In addition, the auxiliary frame 48 and the auxiliary nosebridge 46 need not be included.

As illustrated in FIG. 1B, the auxiliary eyeglasses attachment 14 pivotally engages the eyeglasses 12 by fitting the first magnet 36 between the auxiliary magnets 52 and 54. Likewise, the second magnet 38 fits between the auxiliary magnets 58 and 56. When engaged, the magnets 36, 52, and 54 attract and operate as a left magnetic hinge 60. In addition, when engaged, the magnets 38, 56, and 58 attract and operate as a right magnetic hinge 62. FIG. 1C shows the eyeglasses assembly 10 with the auxiliary eyeglasses attachment 14 in the operative, or "down", position. In the "down" position, the auxiliary eyeglasses attachment 14 provides the user with an auxiliary set of lenses to the lenses of the eyeglasses 12. In addition, the third magnet 40 and first auxiliary magnet 50 attract and operate as a magnetic clasp 64. The magnetic hinge 60, the magnetic hinge 62, and the magnetic clasp 64 all maintain the auxiliary eyeglasses attachment 14 engaged with the eyeglasses 12.

As shown in FIG. 1B, the user may choose to place the auxiliary eyeglasses attachment 14 into the inoperative, or "up" position. The user may either rotate the auxiliary eyeglasses attachment 14 away from the eyeglasses 12, disengage the auxiliary eyeglasses attachment 14 and then re-engage the auxiliary eyeglasses attachment 14 in the "up" position, or any combination thereof. The magnetic forces of the magnetic hinges 60 and 62 are sufficient to hold the auxiliary eyeglasses attachment 14 in any hinged position between the "down" and "up" positions. When the auxiliary eyeglasses attachment 14 is down as illustrated in FIG. 1C, the hinges 60, 62 and the magnetic clasp 64 keep the auxiliary eyeglasses attachment 14 in position. As illustrated in FIG. 1B, when the magnetic means 40 and 50 are unclasped, the hinges 60 and 62 keep the auxiliary eyeglasses attachment 14 attached to the eyeglasses frame 12.

The lenses of both the eyeglasses 12 and the auxiliary eyeglasses attachment 14 may be of any desired type. By way of non-limiting example only, the eyeglasses 12 may include prescription lenses and the auxiliary eyeglasses attachment 14 may include non-prescription, sun-shading lenses. The lenses may also include, but are not limited to, magnifying or reading lenses, light-filtering lenses, or non-prescription lenses. The magnets may be of any suitable type, including neodymium rare earth magnets or magnets of grade 35 or stronger.

Figure 1D:
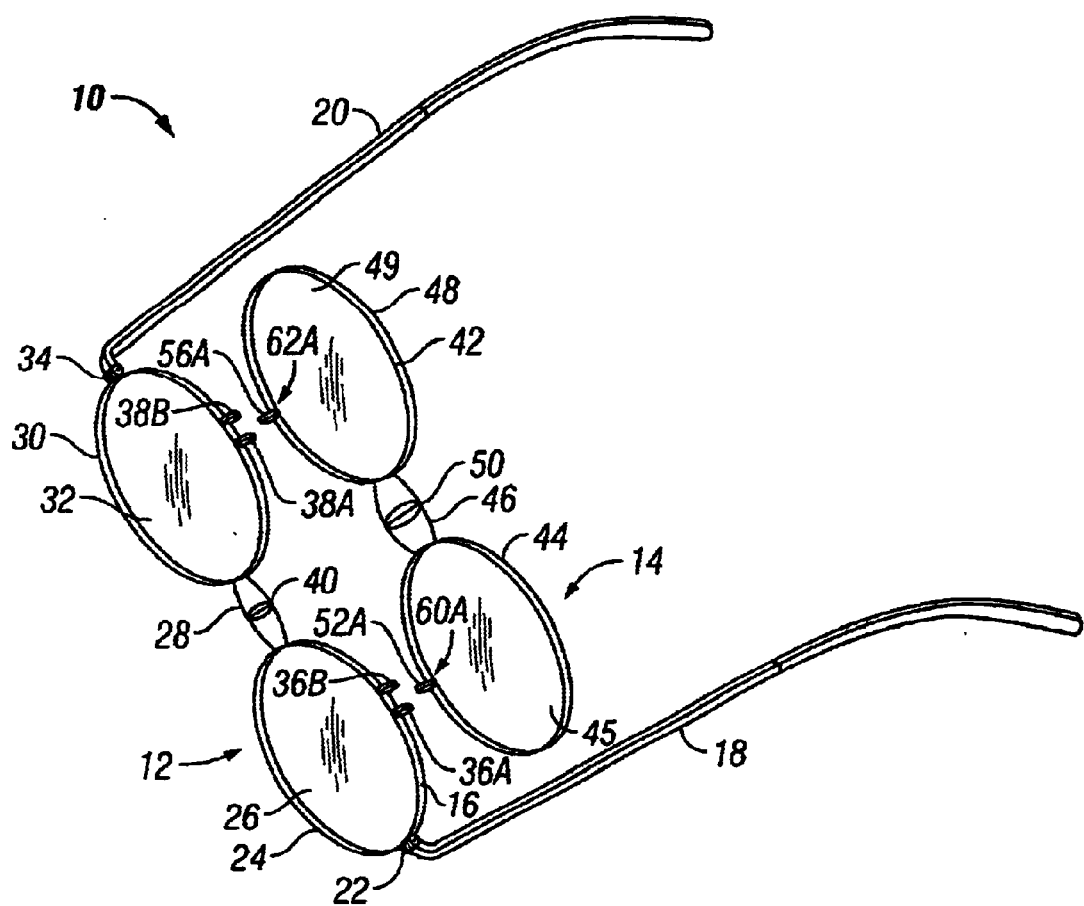
FIG. 1D is a perspective view of an eyeglasses assembly with eyeglasses disengaged from an auxiliary eyeglasses attachment.

As shown in FIG. 1D, the magnets may also be arranged so that there are two magnets engaged with the top of each frame and one auxiliary magnet engaged with each auxiliary frame. For example, magnet 36A and magnet 36B are engaged with the top of frame 24 and magnet 38A and magnet 38B are engaged with the top of frame 30. In addition, magnet 52A gages auxiliary lens frame 44 and magnet 56A engages auxiliary lens frame 48. Magnets 36A, 36B, 38A, 38B, 52A, and 56A all have a N/S magnetic flux. Magnets 36A and 36B engage auxiliary magnet 52A and operate as left magnetic hinge 60A. Similarly, magnets 38A and 38B engage auxiliary magnet 56A and operate as right magnetic hinge 62A. Hinges 60A and 62A operate in the same fashion as hinges 60 and 62 described in FIG. 1A.

Figure 1E:
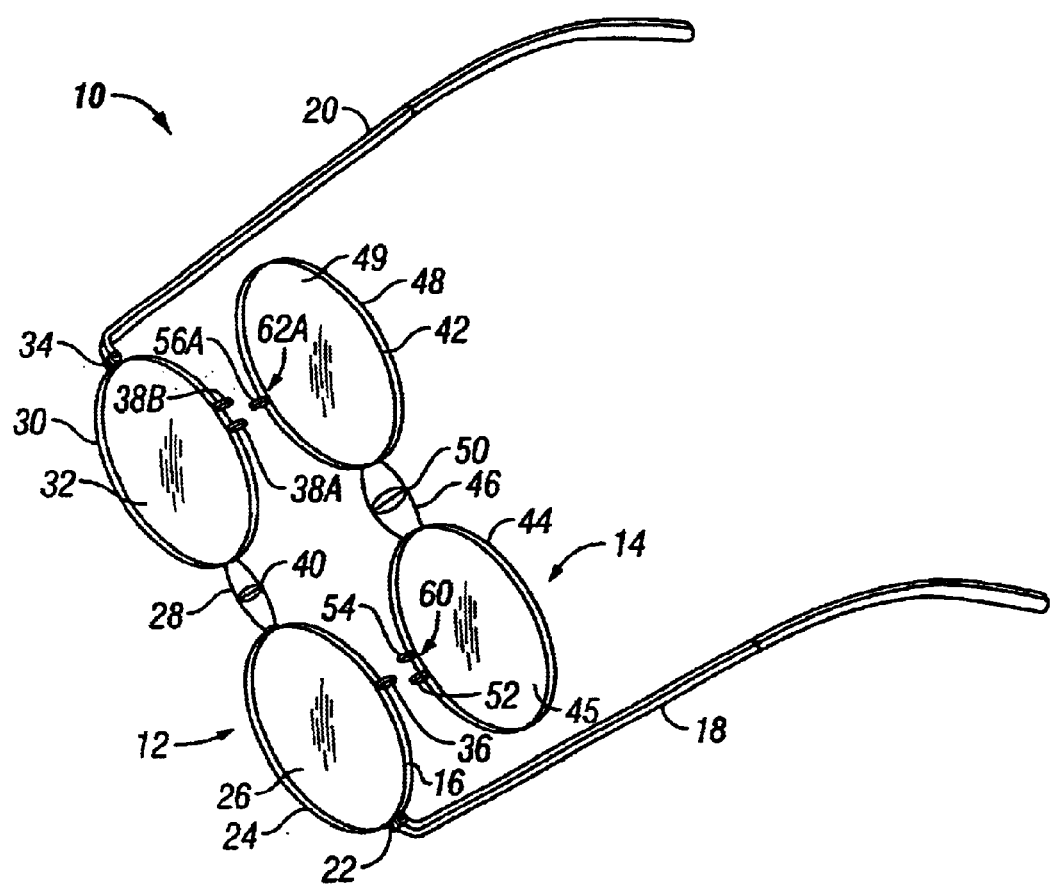
FIG. 1E is a perspective view of an eyeglasses assembly with eyeglasses disengaged from an auxiliary eyeglasses attachment.

As shown in FIG. 1E, the magnets may also be arranged so that a first magnetic hinge comprises two magnets engaged with the top of the eyeglasses frame and one auxiliary magnet engaged with the auxiliary frame and a second magnetic hinge comprises one magnet engaged with the top of the eyeglasses frame and two auxiliary magnets engaged with the auxiliary frame. For example, magnet 38A and magnet 38B are engaged with the top of frame 30 and magnet 36 engages the top of the frame 24. In addition, magnet 56A engages auxiliary lens frame 48 and magnets 52 and 54 engaged the auxiliary lens frame 44. Magnets 38A, 38B, 36, 56A, 52, and 54 all have a N/S magnetic flux. Auxiliary magnets 52 and 54 engage with magnet 36 and operate as left magnetic hinge 60 as discussed above. Similarly, magnets 38A and 38B engage with auxiliary magnet 56A and operate as right magnetic hinge 62A. Hinges 60 and 62A operate in the same fashion as hinges 60 and 62 described in FIG. 1A.

Figure 2A:
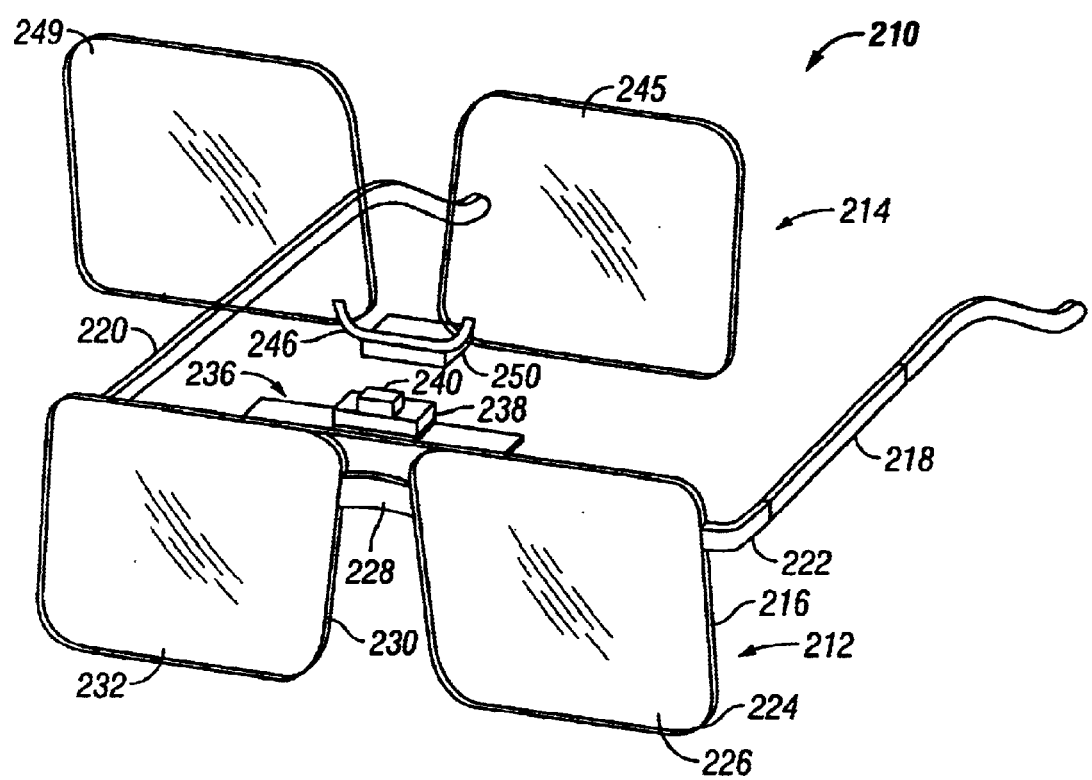
FIG. 2A is a perspective view of another embodiment of the eyeglasses assembly with the auxiliary eyeglasses attachment disengaged from the eyeglasses.
Figure 2B:
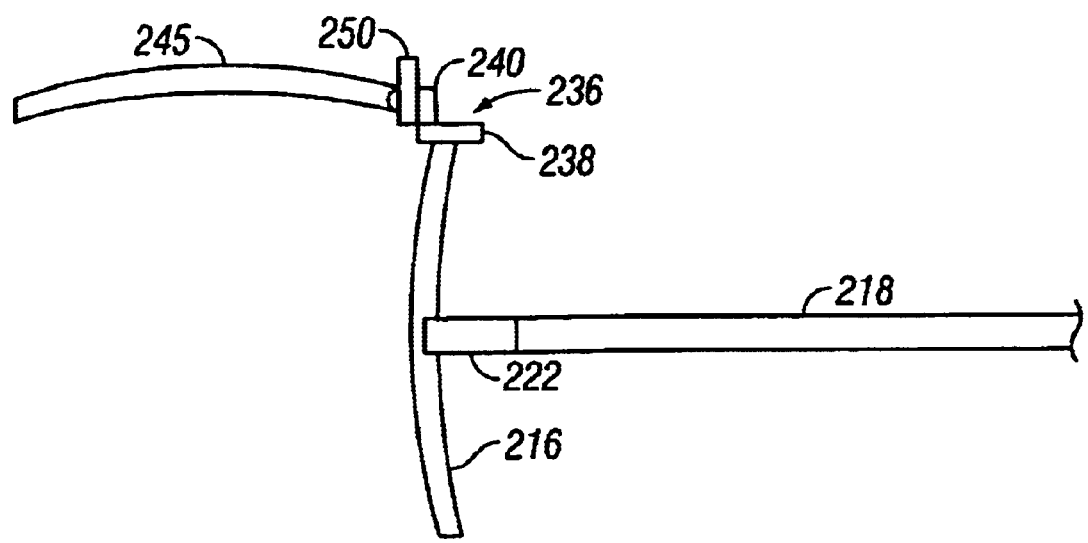
FIG. 2B is a side elevation view of the eyeglasses assembly of the embodiment of FIG. 2A with the auxiliary eyeglasses attachment engaged with the eyeglasses.
Figure 2C:
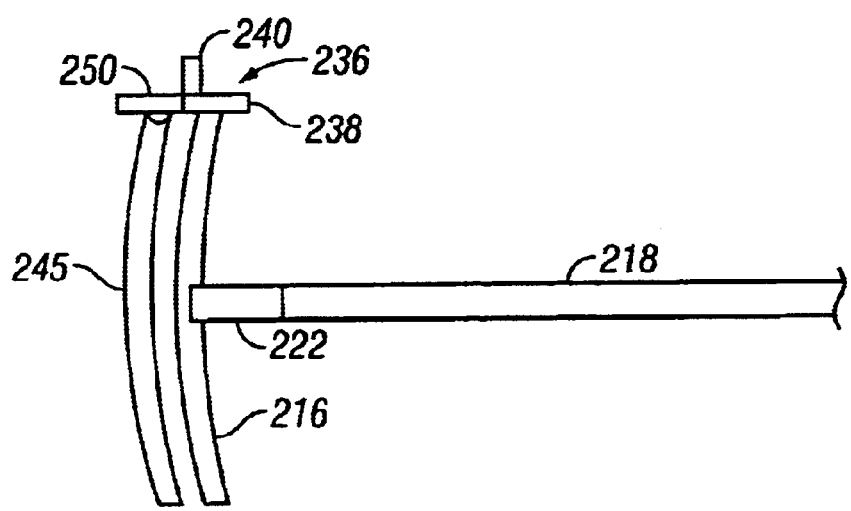
FIG. 2C is a side elevation view of the eyeglasses assembly of the embodiment of FIG. 2A with the auxiliary eyeglasses attachment engaged with the eyeglasses.

FIGS. 2A–2C show an eyeglasses assembly 210 comprising eyeglasses 212 and a removable, auxiliary eyeglasses attachment 214. In addition to the eyeglasses frame 216, the eyeglasses 212 also comprise a left temple bar 218 and a right temple bar 220, both of which are hinged to the frame 216. The eyeglasses 212 further comprise a left temple extension 222, a left lens frame 224, a left lens 226, a nosebridge 228, a right lens frame 230, a right lens 232, and a right temple extension (not shown). In addition, the eyeglasses 212 comprise a magnet 236 engaged with the top of the frame 224 that has a first portion 238 and a second portion 240.

The auxiliary eyeglasses attachment 214 comprises a left auxiliary lens 245, an auxiliary nosebridge 246, and a right auxiliary, lens 249. In addition, the auxiliary eyeglasses attachment 214 comprises an auxiliary magnet 250 engaged with the auxiliary nosebridge 246.

As shown in FIG. 2B, the auxiliary eyeglasses attachment 214 engages the eyeglasses 212 by the magnet 236 and auxiliary magnet 250 attracting each other. When engaged, the magnet 236 and the auxiliary magnet 250 attract and operate as a magnetic hinge 260. The shape of the magnet 236 and the auxiliary magnet 250 and the orientation of their magnetic fields allow the magnetic hinge 260 to bias the auxiliary eyeglasses attachment 214 in either the "down" or the "up" position. Thus, the first portion 238 on the magnet 236 biases the auxiliary eyeglasses attachment 214 in the "down" position and a second portion 240 biases the auxiliary eyeglasses attachment 214 in the "up" position. FIG. 2C shows the eyeglasses assembly 210 with the auxiliary eyeglasses attachment 214 in the operative, or "down", position. In the down position, the auxiliary eyeglasses attachment 214 provides the user with an auxiliary set of lens to the lenses of the eyeglasses 212.

As shown in FIG. 2B, the user may choose to place the auxiliary eyeglasses attachment 214 into the inoperative, or "up" position. The user may either rotate the auxiliary eyeglasses attachment 214 away from the eyeglasses 212, disengage the auxiliary eyeglasses attachment 214 and then re-engage the auxiliary eyeglasses attachment 214 in the "up" position, or any combination thereof.

The lenses of both the eyeglasses 212 and the auxiliary eyeglasses attachment 214 may be of any desired type. By way of non-limiting example only, the eyeglasses 212 may include prescription lenses and the auxiliary eyeglasses attachment 214 may include non-prescription, sun-shading lenses. The lenses may also include, but are not limited to, magnifying or reading lenses, light-filtering lenses, or non-prescription lenses. The magnets may be of any suitable type, including neodymium rare earth magnets or magnets of grade 35 or stronger.

Figure 3A:
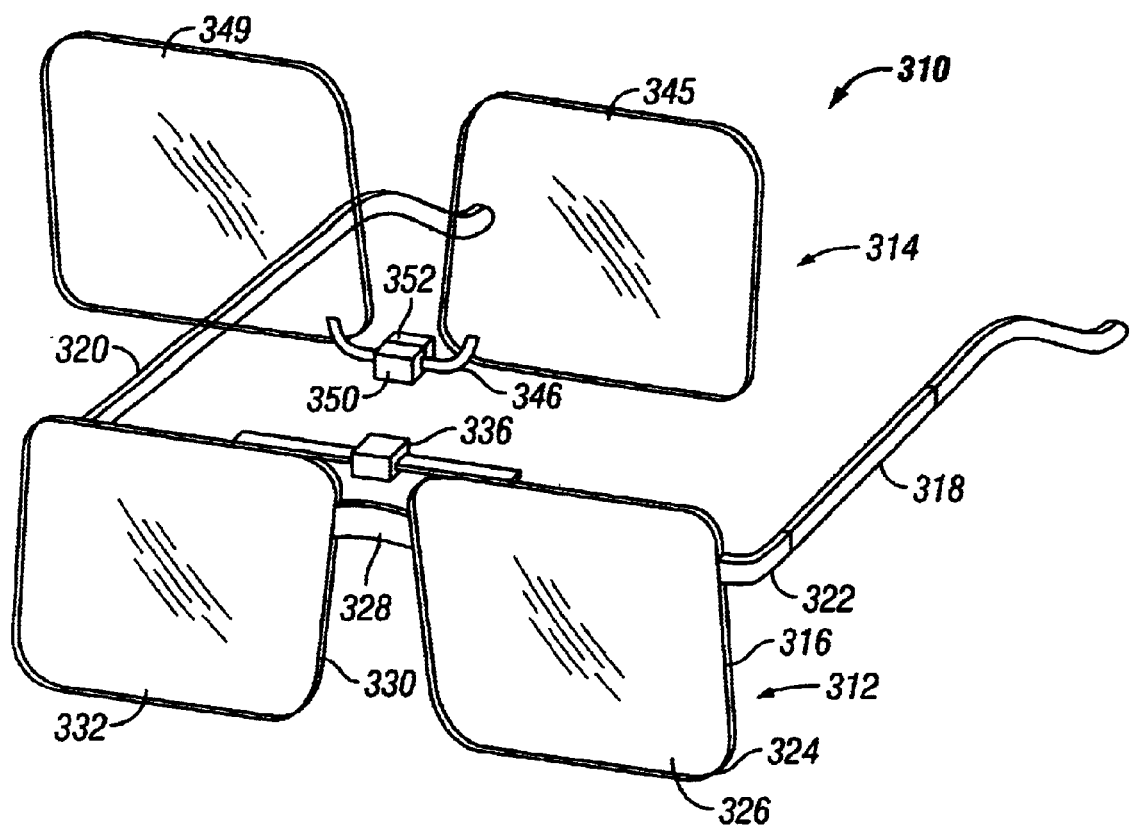
FIG. 3A is a perspective view of another embodiment of the eyeglasses assembly with the auxiliary eyeglasses attachment disengaged from the eyeglasses.
Figure 3B:
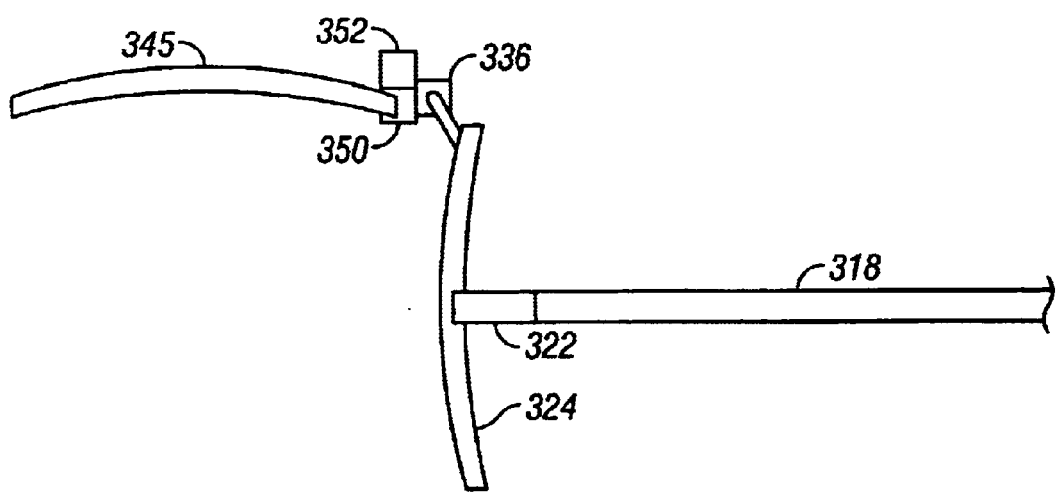
FIG. 3B is a side elevation view of the eyeglasses assembly of the embodiment of FIG. 3A with the auxiliary eyeglasses attachment engaged with the eyeglasses.
Figure 3C:
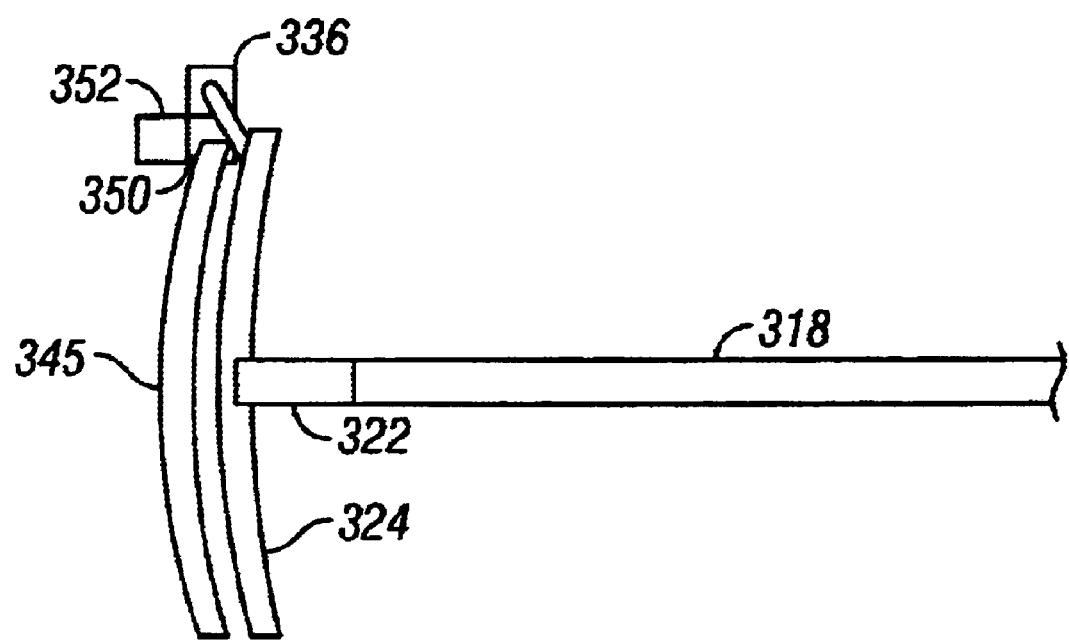
FIG. 3C is a side elevation view of the eyeglasses assembly of the embodiment of FIG. 3A with the auxiliary eyeglasses attachment engaged with the eyeglasses.

FIGS. 3A–3C show an eyeglasses assembly 310 comprising eyeglasses 312 and a removable, auxiliary eyeglasses attachment 314. In addition to the eyeglasses frame 316, the eyeglasses 312 also comprise a left temple bar 318 and a right temple bar 320, both of which are hinged to the frame 316. The eyeglasses 312 further comprise a left temple extension 322, a left lens frame 324, a left lens 326, a nosebridge 328, a right lens frame 330, a right lens 332, and a right temple extension (not shown). In addition, the eyeglasses 312 comprise a magnet 336 engaged with the top of the frame 324.

The auxiliary eyeglasses attachment 314 comprises a left auxiliary lens 345, an auxiliary nosebridge 346, and a right auxiliary lens 349. In addition, the auxiliary eyeglasses attachment 314 comprises a first auxiliary magnet 350 engaged with the auxiliary nosebridge 346 and a second auxiliary magnet 352 engaged with the first auxiliary magnet 350.

As shown in FIG. 3B, the auxiliary eyeglasses attachment 314 engages the eyeglasses 312 by the magnet 336 and auxiliary magnets 350, 352 attracting each other. When engaged, the magnet 336 and the auxiliary magnets 350, 352 operate as a magnetic hinge 360. FIG. 3C shows the eyeglasses assembly 310 with the auxiliary eyeglasses attachment 314 in the operative, or "down", position. The position of the magnet 336 and the auxiliary magnet 350 and the orientations of the magnetic fields allow the magnet 336 to attract the auxiliary magnet 350 when the auxiliary eyeglasses attachment 314 is in the "down" position. Thus, the magnet 336 and the auxiliary magnet 350 attract each other to bias the auxiliary eyeglasses attachment 314 in the "down" position. In the "down" position, the auxiliary eyeglasses attachment 314 provides the user with an auxiliary set of lens to the lenses of the eyeglasses 312.

As shown in FIG. 3B, the user may choose to place the auxiliary eyeglasses attachment 314 into the inoperative, or "up" position. The user may either rotate the auxiliary eyeglasses attachment 314 away from the eyeglasses 312, disengage the auxiliary eyeglasses attachment 314 and then re-engage the auxiliary eyeglasses attachment 314 in the up position, or any combination thereof. The position of the magnet 336 and the auxiliary magnet 352 and the orientations of the magnetic fields allow the magnet 336 to attract the second auxiliary magnet 352 when the auxiliary eyeglasses attachment 314 is in the "up" position. Thus, the magnet 336 and the second auxiliary magnet 352 attract each other to bias the auxiliary eyeglasses attachment in the "up" position.

The lenses of both the eyeglasses 312 and the auxiliary eyeglasses attachment 314 may be of any desired type. By way of non-limiting example only, the eyeglasses 312 may include prescription lenses and the auxiliary eyeglasses attachment 314 may include non-prescription, sun-shading lenses. The lenses may also include, but are not limited to, magnifying or reading lenses, light-filtering lenses, or non-prescription lenses. The magnets may be of any suitable type, including neodymium rare earth magnets or magnets of grade 35 or stronger.

While embodiments have been shown and described, one skilled in the art may make modification without departing from the spirit or teaching of this invention. The embodiments as described are exemplary only and are not limiting. Many variations and modifications of the system and apparatus are possible and are within the scope of the invention. Accordingly, the scope of protection is not limited to the embodiments described, but is only limited by the claims that follow, the scope of which shall include all equivalents of the subject matter of the claims.

What is claimed is:

1. An eyeglasses assembly comprising:
   eyeglasses;
   an auxiliary eyeglasses attachment;
   a magnetic hinge comprising a magnet attached to the eyeglasses and an auxiliary magnet attached to the auxiliary eyeglasses attachment;
   where the magnetic hinge attaches the auxiliary eyeglasses attachment to the eyeglasses;
   where the magnetic hinge allows the auxiliary eyeglasses attachment to rotate relative to the eyeglasses while maintaining magnetic contact between the magnet and the auxiliary magnet during rotation; and
   where the magnetic hinge disengages to allow the auxiliary eyeglasses attachment to be removed from the eyeglasses.

2. The eyeglasses assembly of claim 1 where the eyeglasses further comprise a first eyeglasses temple bar, a second eyeglasses temple bar, a first lens, a second lens, and an eyeglasses frame, the eyeglasses frame comprising a nosebridge.

3. The eyeglasses assembly of claim 1 where the auxiliary eyeglasses attachment further comprises two auxiliary lenses and an auxiliary nosebridge.

4. The eyeglasses assembly of claim 1 where the magnetic hinge allows the auxiliary eyeglasses attachment to rotate between at least a down position and an up position.

5. The eyeglasses assembly of claim 1 where the magnetic hinge is capable of maintaining the auxiliary eyeglasses attachment in a position where the auxiliary eyeglasses attachment is rotated away from the eyeglasses.

6. The eyeglasses assembly of claim 1 where the eyeglasses further comprise a clasp magnet and the auxiliary eyeglasses further comprise an auxiliary clasp magnet that attracts the clasp magnet at least when the auxiliary eyeglasses attachment is in a down position.

7. The eyeglasses assembly of claim 1 where the lenses are corrective lenses, magnifying lenses, shading lenses, light-filtering lenses, or non-corrective lenses.

8. The eyeglasses assembly of claim 1 where the auxiliary lenses are corrective lenses, magnifying lenses, shading lenses, light-filtering lenses, or non-corrective lenses.

9. The eyeglasses assembly of claim 1 where each magnet and each auxiliary magnet are neodymium magnets.

10. An eyeglasses assembly comprising:
    eyeglasses;
    an auxiliary eyeglasses attachment;
    a first magnetic hinge and a second magnetic hinge, each hinge comprising two magnets attached to the top of the eyeglasses and an auxiliary magnet attached to the top of the auxiliary eyeglasses attachment;
    where the magnetic hinges attach the auxiliary eyeglasses attachment to the eyeglasses with the auxiliary magnet in between the two magnets;
    where the magnetic hinges allow the auxiliary eyeglasses attachment to rotate relative to the eyeglasses between at least a down position and an up position; and
    where the magnetic hinges disengage to allow the auxiliary eyeglasses attachment to be removed from the eyeglasses.

11. The eyeglasses assembly of claim 10 where the eyeglasses further comprise a first eyeglasses temple bar, a second eyeglasses temple bar, a first lens, a second lens, and an eyeglasses frame, the eyeglasses frame comprising a nosebridge.

12. The eyeglasses assembly of claim 10 where the auxiliary eyeglasses attachment further comprises two auxiliary lenses and an auxiliary nosebridge.

13. The eyeglasses assembly of claim 10 where the magnetic hinges are capable of maintaining the auxiliary eyeglasses attachment in a position where the auxiliary eyeglasses attachment is rotated away from the eyeglasses.

14. The eyeglasses assembly of claim 10 where the eyeglasses further comprise a clasp magnet and the auxiliary eyeglasses further comprise an auxiliary clasp magnet that attracts the clasp magnet at least when the auxiliary eyeglasses attachment is in the down position.

15. The eyeglasses assembly of claim 10 where the lenses are corrective lenses, magnifying lenses, shading lenses, light-filtering lenses, or non-corrective lenses.

16. The eyeglasses assembly of claim 10 where the auxiliary lenses are corrective lenses, magnifying lenses, shading lenses, light-filtering lenses, or non-corrective lenses.

17. The eyeglasses assembly of claim 10 where each magnet and each auxiliary magnet are neodymium magnets.

18. An eyeglasses assembly comprising:
    eyeglasses;
    an auxiliary eyeglasses attachment;
    a first magnetic binge and a second magnetic hinge, each hinge comprising a magnet attached to the top of the eyeglasses and two auxiliary magnets attached to the top of the auxiliary eyeglasses attachment;

where the magnetic binges attach the auxiliary eyeglasses attachment to the eyeglasses with the magnet in between the two auxiliary magnets;

where the magnetic hinges allow the auxiliary eyeglasses attachment to rotate relative to the eyeglasses between at least a down position and an up position; and where the magnetic binges disengage to allow the auxiliary eyeglasses attachment to be removed from the eyeglasses.

19. The eyeglasses assembly of claim 18 where the eyeglasses further comprise a first eyeglasses temple bar, a second eyeglasses temple bar, a first lens, a second lens, and an eyeglasses frame, the eyeglasses frame comprising a nosebridge.

20. The eyeglasses assembly of claim 18 where the auxiliary eyeglasses attachment further comprises two auxiliary lenses and an auxiliary nosebridge.

21. The eyeglasses assembly of claim 18 where the magnetic hinges are capable of maintaining the auxiliary eyeglasses attachment in a position where the auxiliary eyeglasses attachment is rotated away from the eyeglasses.

22. The eyeglasses assembly of claim 18 where the eyeglasses further comprise a clasp magnet and the auxiliary eyeglasses further comprise an auxiliary clasp magnet that attracts the clasp magnet at least when the auxiliary eyeglasses attachment is in the down position.

23. The eyeglasses assembly of claim 18 where the lenses are corrective lenses, magnifying lenses, shading lenses, light-filtering lenses, or non-corrective lenses.

24. The eyeglasses assembly of claim 18 further the auxiliary lenses are corrective lenses, magnifying lenses, shading lenses, light-filtering lenses, or non-corrective lenses.

25. The eyeglasses assembly of claim 18 where each magnet and each auxiliary magnet are neodymium magnets.

26. An eyeglasses assembly comprising:

eyeglasses;

an auxiliary eyeglasses attachment;

a first magnetic hinge comprising a magnet attached to the top of the eyeglasses and two auxiliary magnets attached to the top of the auxiliary eyeglasses attachment;

a second magnetic hinge comprising two magnets attached to the top of the eyeglasses and an auxiliary magnet attached to the top of the auxiliary eyeglasses attachment where the magnetic hinges attach the auxiliary eyeglasses attachment to the eyeglasses with the first magnetic hinge having the magnet in between the two auxiliary magnets and the second magnetic hinge having the auxiliary magnet in between the two magnets;

where the magnetic hinges allow the auxiliary eyeglasses attachment to rotate relative to the eyeglasses between at least a down position and an up position; and where the magnetic hinges disengage to allow the auxiliary eyeglasses attachment to be removed from the eyeglasses.

27. The eyeglasses assembly of claim 26 where the eyeglasses further comprise a first eyeglasses temple bar, a second eyeglasses temple bar, a first lens, a second lens, and an eyeglasses frame, the eyeglasses frame comprising a nosebridge.

28. The eyeglasses assembly of claim 26 where the auxiliary eyeglasses attachment further comprises two auxiliary lenses and an auxiliary nosebridge.

29. The eyeglasses assembly of claim 26 where the magnetic hinges are capable of maintaining the auxiliary eyeglasses attachment in a position where the auxiliary eyeglasses attachment is rotated away from the eyeglasses.

30. The eyeglasses assembly of claim 26 where the eyeglasses further comprise a clasp magnet and the auxiliary eyeglasses further comprise an auxiliary clasp magnet at attracts the clasp magnet at least when the auxiliary eyeglasses attachment is in the down position.

31. The eyeglasses assembly of claim 26 where the lenses are corrective lenses, magnifying lenses, shading lenses, light-filtering lenses, or non-corrective lenses.

32. The eyeglasses assembly of claim 26 where the auxiliary lenses are corrective lenses, magnifying lenses, shading lenses, light-filtering lenses, or non-corrective lenses.

33. The eyeglasses assembly of claim 26 where each magnet and each auxiliary magnet are neodymium magnets.

* * * * *